G. CRANDELL.
Churn.
No. 67,960. Patented Aug. 20, 1867.
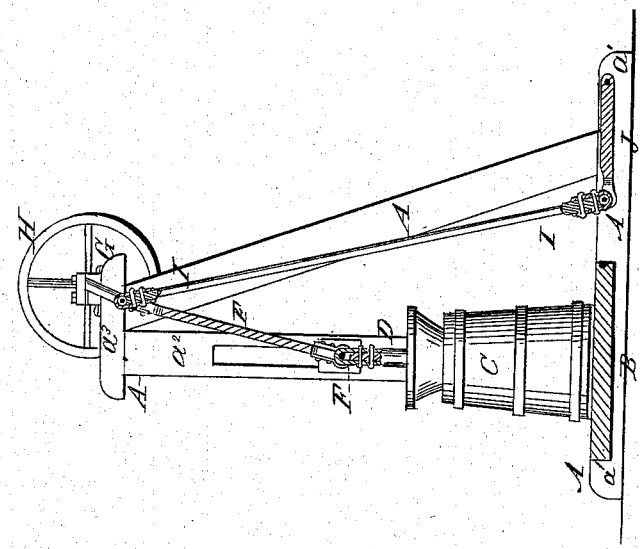
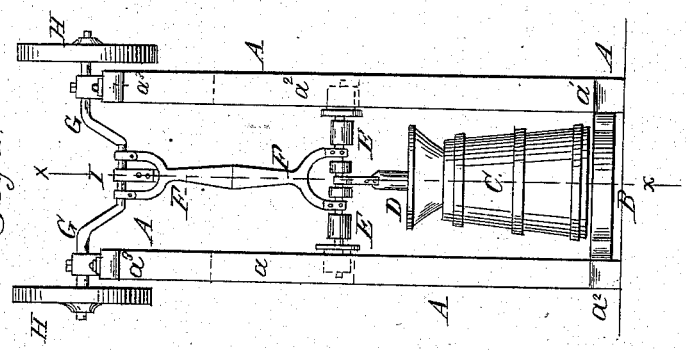
Witnesses:
Wm Truson
John Fraser
Inventor:
Gussy Crandell
Per Munn
Attys

United States Patent Office.

GURNSEY CRANDELL, OF RHINEBECK, NEW YORK.

Letters Patent No. 67,960, dated August 20, 1867.

---

IMPROVEMENT IN CHURNING MACHINE.

---

*The Schedule referred to in these Letters Patent and making part of the same.*

---

TO ALL WHOM IT MAY CONCERN:

Be it known that I, GURNSEY CRANDELL, of Rhinebeck, in the county of Dutchess, and State of New York, have invented a new and improved Churning Machine; and I do hereby declare that the following is a full, clear, and exact description thereof, which will enable those skilled in the art to make and use the same, reference being had to the accompanying drawings, forming part of this specification, in which—

Figure 1 is a front view of my improved churning machine.

Figure 2 is a vertical section of the same, taken through the line $x\ x$, fig. 1.

Similar letters of reference indicate corresponding parts.

My invention has for its object to furnish a churning machine, simple in construction, easily operated, and which may be manufactured at a comparatively small expense; and it consists in the combination of the sliding bar, connecting-rod or rods, crank-shaft, two balance-wheels, and operating lever with each other and with the supporting frame, the whole being constructed and arranged as hereinafter more fully described.

A is the frame of the machine upon a platform, B, attached to the sills $a^1$, on which the churn C stands. D is the dasher-handle, the upper end of which is removably pivoted to the centre of the cross-bar E, the ends of which, or slides attached to its ends, slide up and down in vertical slots or grooves in the vertical posts $a^2$ of the frame A. To the bar or shaft E, upon each side of its centre, is pivoted the lower forked end of the connecting-rod F, the upper end of which is pivoted to a double crank formed upon the crank-shaft G, as shown in fig. 1. If desired the connecting-rod F, having two forked ends, may be replaced by two smaller connecting-rods, the ends of which are pivoted to the cross-bar or shaft E, and to the crank of the crank-shaft G, upon the opposite sides of the centres of said shafts. The crank-shaft G revolves in bearings upon the top plates $a^3$ of the frame A, and has fly or balance-wheels H attached to its ends, as shown in fig. 1. The fly-wheels H should be so constructed and attached to the crank-shaft G that when left at rest they will hold the dasher-handle F raised so that it may be readily detached and the churn removed when desired. The bearings for the crank-shaft G may be formed of friction-wheels or rollers placed in a small box attached to the top plates $a^3$ of the frame A, to diminish the friction. I is the operating rod or lever, the upper end of which is pivoted to the centre of the crank of the crank-shaft G, as shown in fig. 1.

The machine may be operated by taking hold of the lower end of the rod I with the hand, or the lower end of said rod may be pivoted to a handle, J, so as to be operated by the operator with his foot, or the lower end of said rod may be connected with any desired power. The frame A may, if desired, be placed over a pump, and the end of the piston-rod connected with the shaft E, enabling the pump to be worked with the greatest ease.

I claim as new, and desire to secure by Letters Patent—

The combination of the sliding-bar E, connecting-rod or rods F, crank-shaft G, fly-wheels H, and operating rod I with each other, and with the frame A, substantially as herein shown and described, and for the purpose set forth.

The above specification of my invention signed by me this 7th day of June, 1867.

GURNSEY CRANDELL.

Witnesses:
WM. F. MCNAMARA,
JAMES T. GRAHAM.